(12) United States Patent
Tichener et al.

(10) Patent No.: X9761
(45) Date of Patent: Jun. 22, 1836

(54) FENCE PICKETS, CUTTING

(76) Inventors: John Tichener; Liah Goodrich; George A. Hart

John Tichenor, Siah Goodrich, & Geo. A. Hart - State of N.Y.
Letters Patent
Dated June 22d 1836.

(The Schedule referred to in these Letters Patent, and making part of the same, containing a description in the words of the said John Tichenor, Siah Goodrich, and George A. Hart themselves, of their Improvement in the Machine for cutting fence Pickets.

To all to whom these presents shall come, Be it known that we John Tichenor and George A. Hart of Ithaca, and Siah Goodrich of Groton in the County of Tompkins and State of New York have invented a new & useful improvement in making fence pickets, and that the following is a full and exact description thereof. - The machine for making the pickets is in the form of a cylinder

1.

about five feet in diameter of wood or metal, the rim of which is to be as wide as the length of the Picket head is wanted, the surface of which is to be made the same shape as the pickets are pointed; through this cylinder are cut two throats opposite each other one & 1/2 inches wide and as long as the picket head is wanted; the throats are for the passage of the chips as they are cut; this cylinder is to be hollow with a head or cover only on one side & the other entirely open. A shaft is put through by a hub fastened to this end or head on which it revolves. The edges of these are chizels and set leaving a gap for the chips to pass off. The chisels are set into the cylinder the thickness of the chisel, so as to be even with the face of the cylinder, the edges to form a perfect mitre with the sides to enable it to pass down and cut smooth; in the end or head of the cylinder are two plane irons put in with one corner bevelled and so set as to commence cutting first; which will have the same effect as shoving a smoothing plane across a board with one corner before the other instead of shoving straight forward; the head or end is about 1/2 an inch bevelling so that the stuff in planing will not come in contact with the iron which is coming up on the opposite side, there can be a slat guage or carriage to shove the stuff over against. This wheel or cylinder is set on a frame of suitable height and size & revolves by a crank or strap to cut the picket heads the end of the picket is to be placed against a guage at suitable distance to bring the other end in a proper situation to be cut, which is to be moved up as fast as the irons cut in coming over.

(What we claim as our own invention and not previously known in the above described machine is the cylinder & the form of the edges of chizels or cutting tools. The same chizels may be operated upon a small —— gate running up & down on slides by a crank.

Witnessed,
Augustus Merrill
James B. King

John Tichenor
Siah Goodrich
George A. Hart

Records)

(Received and Recorded anew September 27. 1841.)

hops · boil and strain off eight, gallons,— then add 25 lbs white sugar scalded; skim it, then add 1 lb cloves when hot and put it in a keg. When cool add two gallons improved rheumatic drops. Dose for an adult from ½ to 1 wine glass full and repeat at discretion till cured).— Improved Rheumatic Drops. Take of gum myrrh 1 lb; of Golden Seal ½ lb: of Bayberry ½ lb; Capsicum 1 oz, the whole to be put in one gallon of cherry [illegible] wine or high proof brandy and let it be well shaken together. Dose from one to — tea spoon fulls.

What I claim as my discoveries and which I desire to secure by Letters Patent, are the before described modes of preparing and administering the above medicines for the purposes herein named.

Witnesses.
Septimus E. Cartwright
[illegible] Howell.

Samuel Thomson.

Exd
[illegible] (Recd & Recorded anew February 27. 1841.) (1374 words)

---

John Tichener; Siah Goodrich; & Geo. A. Hart_ State of N.Y.
Letters Patent
Dated June 22d 1836.

(The Schedule referred to in these Letters Patent, and making part of the same, containing a description in the words of the said John Tichener, Siah Goodrich, and George A. Hart themselves, of their Improvement in the Machine for cutting fence Pickets.

---

To all to whom these presents shall come, Be it known that we John Tichener and George A. Hart of Ithaca, and Siah Goodrich of Groton in the County of Tomkins and State of New York have invented a new & useful improvement in making fence pickets, and that the following is a full and exact description thereof. The machine for making the pickets is in the form of a cylinder about two feet in diameter of wood or metal; the rim of which is to be as wide as the length of the Picket head is wanted, the surface of which is be made the same shape as the pickets are wanted; through this cylinder are cut two throats opposite each other one & 1/2 inches wide and as long as the picket head is wanted; the throats are for the passage of the chips as they are cut, this cylinder is to be hollow with a head or cover only on one end & the other entirely open. A shaft is put through by a hub fastened to this end or head on which it revolves The edge of the irons or chizels are set low enough for the chips to pass off. The chisels are set into the cylinder the thickness of the chisel; so as to be even with the face of the cylinder, the edges to form a perfect mitre with the sides to enable it to pare down and cut smooth; in the end or head of the cylinder are two plane irons put in with one corner bevelled and so set as to commence cutting first, which will have the same effect as shoving a smoothing plane across a board with one corner before the other instead of shoving straight forward; the head or end is about 1/2 an inch bevelling so that the stuff in planing will not come in contact with the iron which is coming up on the opposite side there can be a slab guage or carriage to shove the stuff over against. This wheel or cylinder is set on a frame of suitable height and size & revolves by a crank or strap to cut the picket head. One end of the picket is to be placed against a guage a suitable distance to bring the other end in a proper situation to be cut, which is to be moved up as fast as the irons cut in coming over.

(What we claim as our own invention and not previously known in the above described machine is the cylinder & the form of the edges of chizels or cutting tools. The same chizels may be operated upon a small [illegible] gate running up & down on slides by a crank.

(Witnesses) Augustus Merrill, James B. King

John Tichener [illegible]
Siah Goodrich [illegible]
George C. Hart (560 words)

(Received and Recorded anew September 27. 1841.)